US011379712B2

(12) United States Patent
Chatterjee et al.

(10) Patent No.: US 11,379,712 B2
(45) Date of Patent: Jul. 5, 2022

(54) AVOIDING CYCLES IN NEURAL NETWORKS

(71) Applicant: HEWLETT PACKARD ENTERPRISE DEVELOPMENT LP, Houston, TX (US)

(72) Inventors: Soumitra Chatterjee, Karnataka (IN); Sunil Vishwanathpur Lakshminarasimha, Karnataka (IN); Mohan Parthasarathy, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 756 days.

(21) Appl. No.: 16/155,036

(22) Filed: Oct. 9, 2018

(65) Prior Publication Data
US 2020/0110984 A1      Apr. 9, 2020

(51) Int. Cl.
*G06N 3/063* (2006.01)
(52) U.S. Cl.
CPC .................... *G06N 3/063* (2013.01)
(58) Field of Classification Search
CPC .......... G06N 3/063; G06N 3/02; G06N 5/027; G06N 5/025
See application file for complete search history.

(56) References Cited

U.S. PATENT DOCUMENTS

2007/0294671 A1\* 12/2007 Demetriou .......... G06F 11/3664
717/124
2017/0200094 A1   7/2017 Bruestle
2018/0129967 A1\* 5/2018 Herreshoff .............. G06N 5/02

OTHER PUBLICATIONS

Misale, Claudia. "PiCo: A domain-specific language for data analytics pipelines." (2017). (Year: 2017).\*
Ward, G. (2011). Computing and applying variable-resolution data for bidirectional scattering distribution functions. In Technical Report. Anyhere Software Berkeley, CA, US. (Year: 2011).\*
Kalchbrenner, N., Grefenstette, E., & Blunsom, P. (2014). A convolutional neural network for modelling sentences. arXiv preprint arXiv:1404.2188. (Year: 2014).\*

(Continued)

*Primary Examiner* — Kamran Afshar
*Assistant Examiner* — Lokesha G Patel
(74) *Attorney, Agent, or Firm* — Nolte Lachenbach Siegel

(57) ABSTRACT

Disclosed is a method, system, and computer readable medium to manage (and possibly replace) cycles in graphs for a computer device. The method includes detecting a compound operation including a first tensor, the compound operation resulting from source code represented in a first graph structure as part of a compilation process from source code to binary executable code. To address a detected cycle, an instance of a proxy class may be created to store a pointer to a proxy instance of the first tensor based on the detection. In some examples, using the instance of the proxy class facilitates implementation of a level of indirection to replace a cyclical portion of the graph structure with an acyclical portion such that the second graph structure indicates assignment of a result of the compound operation to the proxy instance of the first tensor. Optimization may reduce a total number of indirection replacements.

20 Claims, 9 Drawing Sheets

(56) References Cited

OTHER PUBLICATIONS

Abadi, M., Barham, P., Chen, J., Chen, Z., Davis, A., Dean, J., . . . & Zheng, X. (2016). Tensorflow: A system for large-scale machine learning. In 12th {USENIX} symposium on operating systems design and implementation ({OSDI} 16) (pp. 265-283). (Year: 2016).*

Dyer, C., Ballesteros, M., Ling, W., Matthews, A., & Smith, N. A. (2015). Transition-based dependency parsing with stack long short-term memory. arXiv preprint arXiv: 1505.08075. (Year: 2015).*

Trivedi, K. S., & Sahner, R. (2009). SHARPE at the age of twenty two. ACM SIGMETRICS Performance Evaluation Review, 36(4), 52-57. (Year: 2009).*

Rathgeber, F. (2014). Productive and efficient computational science through domain-specific abstractions (Doctoral dissertation, Imperial College London). (Year: 2014).*

Gabriel Nivasch, "Cycle detection and the stack algorithm", available online at <http://www.gabrielnvasch.org/fun/cycle-detection>, Nov. 2004, 4 pages.

Hu et al., "Dot-Product Engine for Neuromorphic Computing: Programming 1T1M Crossbar to Accelerate Matrix-Vector Multiplication", Hewlett Packard Labs, HPE-2016-23, 7 pages.

John Paul Strachan, "The Dot-Product Engine (DPE): exploring high efficiency analog multiplication with memristor arrays", Dec. 11, 2015, 29 pages.

Robert W. Floyd, "Floyd's Cycle Detection Algorithm (The Tortoise and the Hare)", available online at <http://www.siafoo.net/algorithm/10>, Jan. 22, 2010, 2 pages.

Saifoo, "Brent's Cycle Detection Algorithm (The Teleporting Turtle)", available online at <http://www.siafoo.net/algorithm/11>, Jan. 22, 2010, 2 pages.

Wikipedia, "Cycle (graph theory)", available online at <https://en.wikipedia.org/w/index.php?title=Cycle_(graph_theory)&oldid=848520654>, Jul. 2, 2018, 4 pages.

Chainer Documentation "Preferred Networks, Inc. and Preferred Infrastructure, Inc." Aug. 23, 2018.

David Duvenaud et al. in "Convolutional Networks on Graphs for Learning Molecular Fingerprints" Harvard University, 9 pages. https://medium.com/syncedreview/deeplearningwithdynamiccomputationgraphsb64822c8aa7c.

Yuan Yu et al. in "Dynamic Control Flow in Large-Scale Machine Learning" EuroSys '18, Apr. 23-26, 2018, Porto, Portugal.

Nadav Rotem et al. in "Glow: Graph Lowering Compiler Techniques for Neural Networks" http://github.com/pytorch/glow.

The Khronos NNEF Working Group "Neural Network Exchange Format" Version 1.0, Revision 3, Jun. 13, 2018.

"Deep Learning with Dynamic Computation Graphs," Jun. 28, 2017, https://medium.com/syncedreview/deeplearningwithdynamiccomputationgraphsb64822c8aa7c.

Nadav Rotem et al. "Glow: Graph Lowering Compiler Techniques for Neural Networks" arXiv:1805.00907v2 [cs.PL] May 4, 2018, http://github.com/pytorch/glow.

* cited by examiner

AVOIDING CYCLES IN NEURAL NETWORKS

BACKGROUND

A Neural Networks (NN) is a computing concept utilized to model the functioning of the human brain. NN models and frameworks are evolving and techniques are being developed to enable execution of different parts of NN models (e.g., training, testing, and inference) in different computer environments. NNs are also being developed using a variety of software frameworks. Concurrently with framework evolution, multiple dedicated hardware platforms specialized for running NN models are emerging to support the needs of NN and specifics of their development and deployment. Some of these new hardware platforms are developed as accelerators for matrix-vector multiplication, for example, utilizing the natural current accumulation feature of a memristor crossbar. These new hardware platforms, together with a fast conversion algorithm, may be a realistic solution for robust applications having tolerance for lower computing accuracy such as may be used in different NN algorithms. These new hardware platforms sometimes approach computing vector-matrix multiplication in the analog domain. The analog domain may be orders of magnitude more efficient than an implementation on any digital application-specific integrated circuit (ASIC) operating in the digital domain. Further, analog processors like a dot product engine (DPE) may provide beneficial execution environments for NNs, particularly as the crossbar array size is scaled larger over time.

A domain-specific language (DSL) is a language designed to work for a particular kind of computer solution. Specifically, a domain-specific language may represent a language for computer programming that is tailored toward NN applications. In some cases, domain specific languages may be based on standard programming languages, such as, ISO C++ (and others). Basing a language on an existing standard may lead to easier adoption by application developers already familiar with the base language. In general, a DSL may be thought of as an extension to the base language from which the DSL is built. In use, a DSL compiler may be used to compile the NN model expressed in the DSL. The DSL compiler (like other compilers) may generate a binary image suitable for execution on any suitable hardware platform. That is, the DSL compiler may be implemented such that it produces either a portable binary that may be executable across different hardware platforms or may be implemented such that it produces a binary (possibly optimized) for a particular hardware operating environment (e.g., DPE, graphics processing unit (GPU), or a particular ASIC). Additionally, a NN may be modeled as a graph of connected tensors (e.g., variables in a DSL explained in more detail below). In some cases, a graph may undesirably be created in a manner where cycles (loops in a graph) may be introduced. One example programming representation that may inadvertently create a cycle in a graph is a compound operation. In short, a cycle in a graph is present when a path exists between graph nodes such that traversing the path would repeatedly visit the same nodes. Cycles in neural network graphs may present complex challenges during traversal (e.g., NN run-time at test or deployment) and may require computationally costly algorithms to detect after development. Detection and prevention of cycles may allow processing of the ultimate NN graph to be performed more efficiently.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than, shown or possibly in parallel with each other. For a detailed description of various examples, reference will now be made to the accompanying drawings, in which.

DETAILED DESCRIPTION

Figure 1:
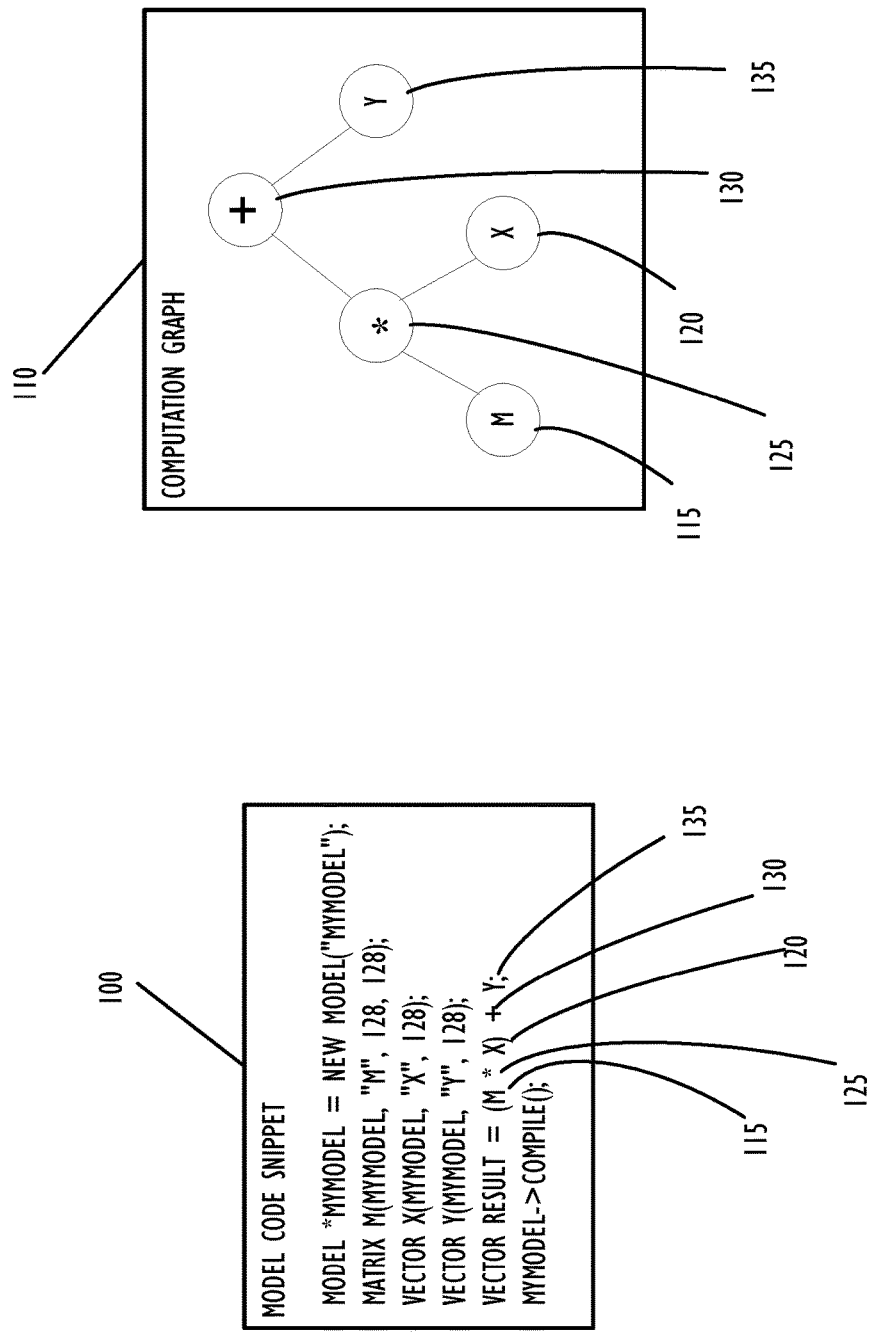
FIG. 1 is a functional block diagram representing a code snippet in a DSL defining a neural network model and a diagram of the computational graph represented by the DSL snippet, according to one or more disclosed implementations.

Examples of the subject matter claimed below will now be disclosed. In the interest of clarity, not all features of an actual implementation are described in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that, such a development effort, even if complex and time-consuming, would be a routine undertaking for those of ordinary skill in the art having the benefit of this disclosure.

Disclosed examples include a DSL based on ISO C++ that may be used by developers to express NN models. A corresponding DSL compiler is also disclosed that may be used to compile the NN model expressed in the DSL and generate a binary image suitable for execution on any applicable hardware platform. That is, some binary images may be portable across different hardware platforms or the binary produced by a compiler may be specific to a pre-determined hardware platform. The choice of portability versus specificity is a design specific choice and may be determined based on a number of factors including performance and/or run-time environment considerations. The example DSL of this disclosure provides a mechanism to allow developers to express NN models in the form of tensors and tensor operations. Tensors, in this context, represent multi-dimensional data arrays. Tensors may be generally thought of as a type of variable in a programming language that may hold a value, be assigned a value, or be passed between different units of execution (e.g., methods, procedures, or the like).

It is possible for a NN, specifically when modeled as a graph of connected tensors, to have cycles introduced into the computation graph when attempting to represent compound operations. In this context, an example of a compound operation includes an operation where the variable (e.g., tensor) appears on both sides of an assignment operation (e.g., X=X+1). Other types of compound operations are also possible and may also introduce undesirable cycles. As mentioned above, a cycle in a graph occurs when a path exists between graph nodes such that traversing the path would repeatedly visit the same nodes. Cycles in NN graphs may be difficult to detect and the difficulty may increase (or decrease) at different points in a software development lifecycle. For example, it may be more cost effective to identify cycles early in a development lifecycle as opposed to after production deployment.

The disclosed DSL attempts to reduce (or eliminate) cycles in NN graphs, in part, by defining building blocks in the form of tensors and tensor operations that may be used to express NN models. However, if developers utilize compound operations to express portions of an NN model, cycles may be introduced to the graph. Detecting cycles at initial compile time and replacing the cycle with an expanded graph portion represents an improvement to the art of NN programming and execution performance. The disclosed DSL and corresponding compiler may work together (with some techniques implemented in only one or the other) to introduce a level of indirection (that will be explained in more detail below) to remove cycles while still allowing developers to provide code in a manner to which they are accustomed. In other words, the disclosed techniques for compiling may prevent cycles even though traditional compilation techniques would have introduced cycles into an NN graph.

As mentioned above, DSL implementations provided herein include building blocks such as tensors and tensor operations that are used to define an NN model. Software code may be written by a developer to use tensors and the various operations defined over these tensors by the DSL, to describe an NN. This description may be referred to as a model. The NN definition may be expressed as a computation graph within the DSL and may form a primary input to a DSL runtime compiler, such as the disclosed DSL compiler. The DSL compiler will, in turn, produce a binary for model execution (and possibly production deployment).

Any number of NN models may be defined (e.g., by using DSL) as part of one or more development processes. For each model, one or more derived computation graphs may be organized into a variety of different topologies (e.g., a directed graph, a layered model, etc.). In some cases, the complexity of a model may influence the formation of the computation graph topology (or determine the type of topology to create). Compound operations, such as those where the result of the computation is assigned to a tensor that is also an operand in the computation, may be problematic because of possible formation of cycles in the computation graph.

One problem with a computation graph that contains cycles is that there may be a run-time risk of executing in an infinite loop. It may therefore be desirable to detect any cycles in the graph and transform those portions of a graph resulting in cycles into an acyclic form. One possible step in the development lifecycle to perform this transformation may be as part of the compilation process that turns source code (provided by developers) into binary executables. In particular, the transformation may be performed by a pre-processor of a compiler or a phase of the compiler that runs before execution of the computation to create binary objects. If graphs are not prevented from being introduced into a computation graph binary (e.g., prevented by the disclosed transformation techniques of the disclosed DSL compiler), detection of cycles in the binary graph may be more complex and computationally time consuming (e.g., the disclosed techniques increase overall efficiency of a development lifecycle and run-time performance).

Run-time detection may further require complex techniques and data structures, in conjunction with graph traversal algorithms to avoid infinite recursions and/or loops. Accordingly, a run-time compiler detection technique may not represent an efficient positioning of loop detection techniques with respect to the development lifecycle. Specifically, run-time detection may be considered costlier because run-time detection is too late. In contrast, the disclosed development time techniques may represent a more efficient, with respect to computation time and development time, positioning in the development lifecycle.

As part of one possible technique to avoid the above referenced complicated methods of detecting cycles in computation graphs, the disclosed DSL compiler employs an algorithm to avoid forming computation graphs with cycles. That is, the disclosed techniques may prevent production of a binary that contains a computation graph cycle. This prevention technique may be implemented, in part, by configuring the disclosed DSL compiler to implement tensors as a proxy class that contains a pointer to the actual tensor implementation. A "class" is an Object Oriented Programming concept that is well understood in the art of programming and further details are beyond the scope of this disclosure. However, the disclosed "proxy" class may be thought of as a level of indirection where fabricated variables and structures are used to replicate access to original variables and structures. More specifically, with respect to this example, fabricated tensors may be created as a level of indirection for an actual tensor using the disclosed proxy class concept. Variables may be maintained as pointers to original variables such that an update to a variable in a proxy version may update the original variable without having the problems associated with a loop in a graph representation.

By having a level of indirection, the disclosed DSL compiler may address each compound operation that assigns the result of an operation to a tensor that's also an operand in the compound operation with a redirection technique. In this redirection technique, a new instance of the TensorImplementation class may be instantiated and linked to the proxy Tensor object where the result of the compound operation is assigned. The use of Tensor and TensorImplementation as proper nouns in this context are only for the purpose of explaining the redirection (or transformation) concept. In a real world example, when using a proxy that references an implementation in actual DSL, that code could use any name to reference a proxy or an implementation class.

One result of using a proxy class to represent a tensor is that it decouples the use of a tensor in the NN program with that of the corresponding computation subgraph that it represents in the DSL. Accordingly, using the instance of the decoupled proxy class may allow the DSL compiler to react (e.g., at compilation of source code) when a compound operation is detected. In some disclosed examples of the DSL compiler, when such an operation is detected, the DSL compiler may create a new instance of a TensorImplementation class and direct the instance of the proxy class to point to the new instance of the implementation class. As a result, in this example, the decoupling approach allows the prior computation subgraph associated with the tensor to remain intact within the model computation graph. At the same time, the proxy class helps establish the relation of the tensor with the new value assigned to the tensor. Thus, the compound operation may be conceptually thought of as being transformed from a compound operation into two non-compound operations. This conceptualization is not intended to be precise but is provided for explanatory purposes. In short, the compound operation is transformed so that a compound operation is replaces with one or more functionally equivalent non-compound operation(s).

In some implementations any suspected compound operation could be transformed with a level of indirection as discussed above. However, one possible optimization to prevent unnecessary transformations may be implemented by a DSL compiler that creates an instance of TensorImplementation in compound operations only when the tensor value is changed after the tensor value is used in the operation. This example optimization may avoid some allocation of memory to a running NN program. Accordingly, this example optimization may be considered to use a minimal number of instances of TensorImplementation for a running NN program.

Having an understanding of the above overview, this disclosure will now explain a non-limiting but detailed example implementation of possible techniques to avoid cycles in NN compute graphs. This example implementation is explained with reference to the figures and includes: a simple acyclical model definition as a DSL code snippet and the representative acyclical computation graph (FIG. 1); simple cyclical model definitions represented as DSL code snippets with a compound operation and the resultant cyclical graphs (FIG. 2); a diagram representing a tensor as an instance of a proxy class holding a pointer to an instance of a TensorImplementation class (FIG. 3); a diagram representing a tensor as an instance of a proxy class, specifically, an example where the pointer in the proxy class is adjusted to point to a new instance of a TensorImplementation as a technique for producing an acyclical computation graph (FIG. 4); a diagram representing the acyclic computation graph formed when the proxy is adjusted to point to a new instance of a TensorImplementation (FIG. 5); an example technique to illustrate an example of how an NN, represented in a DSL, may be compiled using the disclosed cycle avoidance algorithm (FIG. 6); an example processor and computer-readable medium to implement one example of compiling, including application of the cycle avoidance algorithm to an NN represented in a DSL (FIG. 7); an example infrastructure of computers and interconnections between those computers, where the infrastructure may be used as part of the compilation or execution of an NN defined in accordance with the disclosed DSL (FIG. 8); and an example processing device that may be used in one or more devices that may implement compilation or execution of a NN defined in the DSL (FIG. 9).

The examples discussed in this section will use arbitrary names for variables with the purpose of illustrating the concepts of this disclosure. Those of ordinary skill in the art would recognize variables are allowed to be named as any sequence of letters, numbers, and non-alphanumeric characters that are allowed as variable names based on restrictions imposed by an implementation of the DSL compiler.

Referring now to FIG. 1, DSL code snippet 100 represents the NN software code version that may also be represented by a model as illustrated by computation graph 110, which in this case is acyclical (does not have a cycle). This is only one example of an acyclical NN model used here for simplicity and ease of explanation. Those of ordinary skill in the art will recognize that significantly complex NN models may be difficult to create with acyclical computation graphs. In this example, a tensor representing matrix M 115 is multiplied (as indicated by asterisk 125) by a tensor representing vector X 120. Continuing with this example, the result of multiplying M by X is then added 130 to a tensor representing vector Y 135. The result of the overall computation is assigned to a tensor representing vector RESULT on the left hand side of the equal sign (assignment operator) in DSL code snippet 100. This example illustrates that acyclical computations may sometimes be represented and computed in the DSL without resorting to indirection techniques or a special algorithm to avoid cycles. However, it is not always possible that this can be accomplished for more complex (or simply different) code structures as will be explained in more detail below. Thus, sometimes it may be desirable to implement an improved graph generation process, such as the disclosed indirection techniques.

Figure 2:
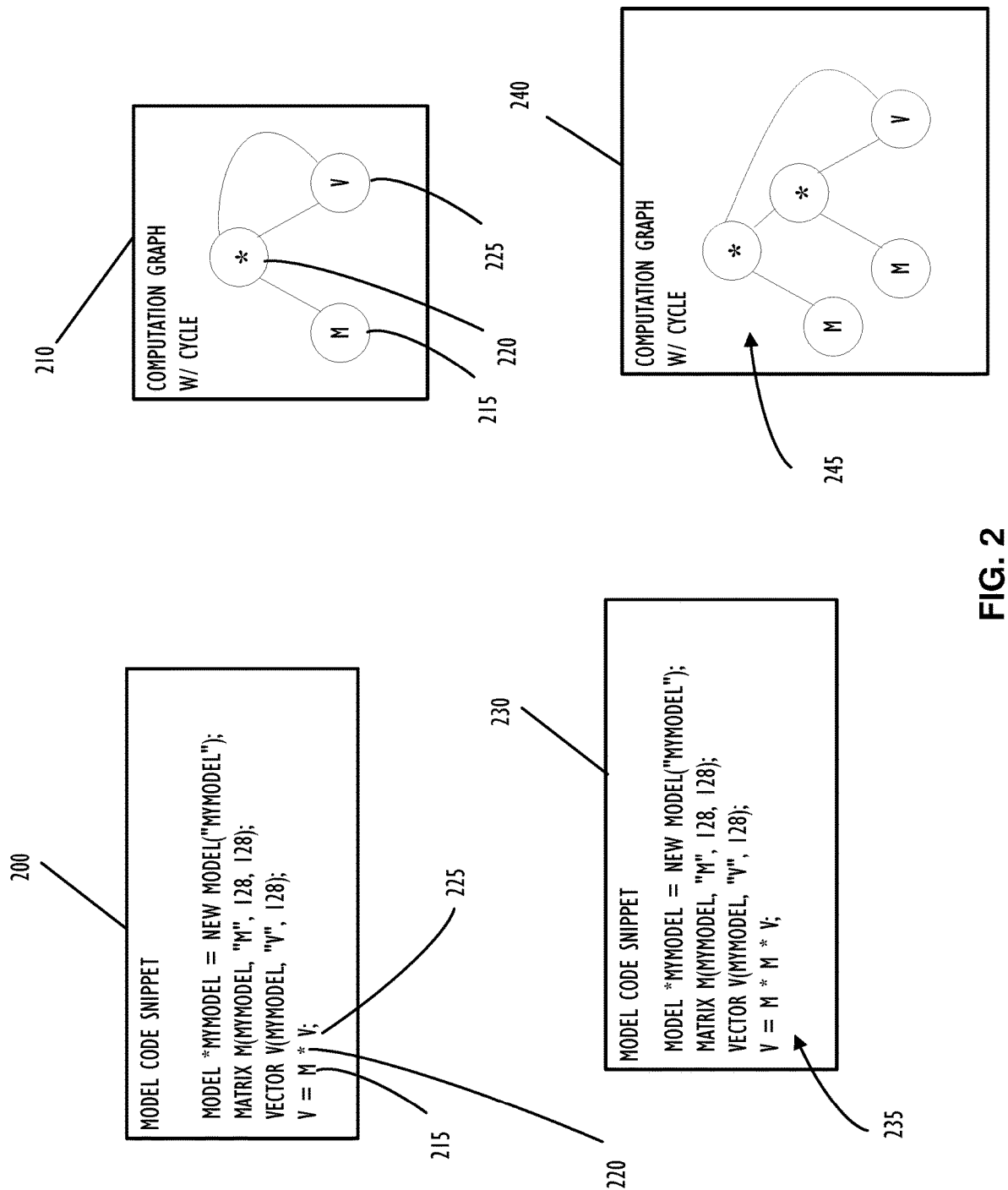
FIG. 2 is a functional block diagram representing an example of a neural network, defined in a DSL and an associated resulting computational graph that results in a cyclical reference in the computation graph (e.g., a compound operation), according to one or more disclosed implementations.

Referring now to FIG. 2, DSL code snippet 200 represents a software code portion for a second example NN model. In this example, a cyclical graph representation as illustrated by computation graph 210 may be generated. As stated above, the examples of this disclosure are used for simplicity and ease of explanation. There are many different types of code sequences that may result in cyclical graph representations. In this example, a tensor representing matrix M 215 is multiplied (indicated by asterisk 220) by a tensor representing vector V 225. The result of the computation is assigned to the tensor labeled V, which is also an operand in the computation. Thus, this is an example of a compound operation as discussed above. An attempt to execute the computation may lead to a loop where M and V are multiplied infinitely. Those of ordinary skill in the art would recognize that performing a computation with a cyclical computation graph requires computationally complex algorithms to detect and remove the cycle before computation can proceed.

Also illustrated in FIG. 2 is DSL code snippet 230 representing an equation (V=M*M*V (235)) with more than merely two variables in the equation that is another example of a compound operation. Any number of variables may be used to create a compound operation and cycles may be created across multiple levels of a computation graph. In this example, computation graph 240 illustrates a graph structure 245 where a cycle exists across multiple levels (e.g., not adjacent levels as in the example represented by computation graph 210 above). There are multiple ways to represent equations within a graph structure and cycles across multiple layers/levels may be problematic in a similar manner to any other cycles, yet the multiple level example may be more difficult to detect. Further, disclosed implementations may be extended to cover more than a single operand being assigned a result. For example, the equation V=V*V may be implemented to use more than one proxy tensor instance in a similar manner to that described for this example simple case.

Figure 3:
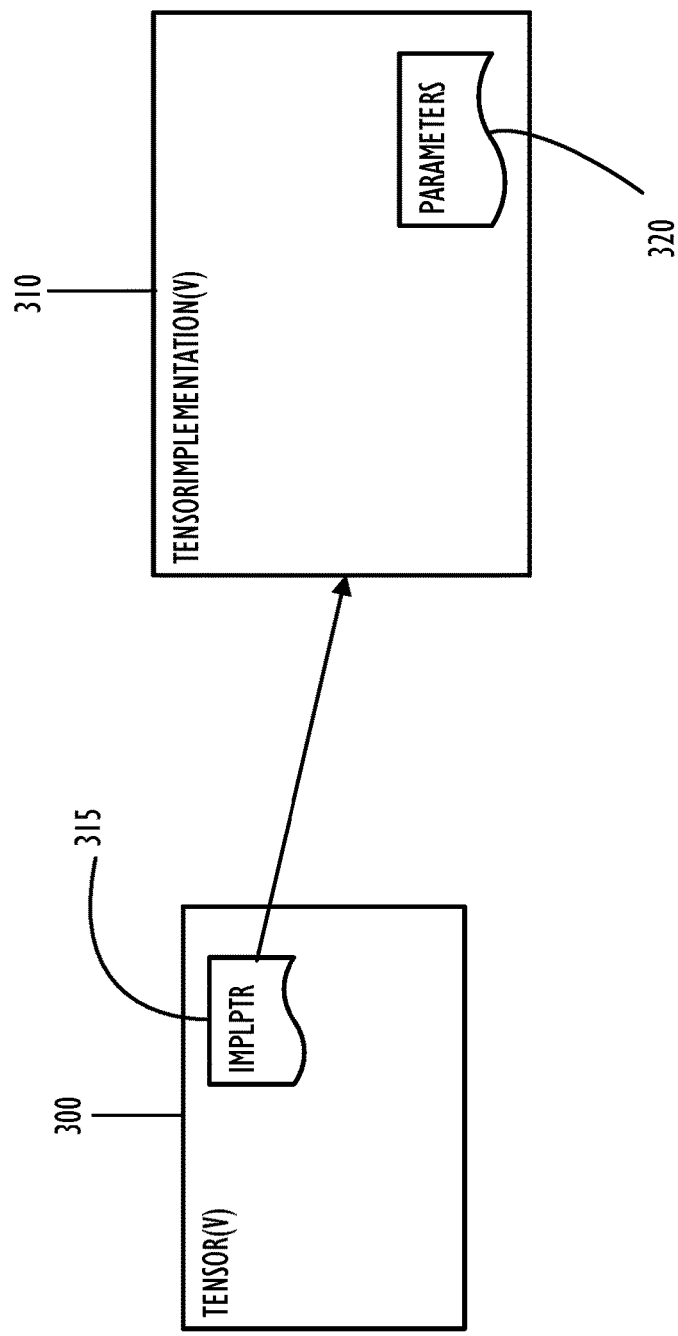
FIG. 3 is a block diagram representing an example implementation of a tensor in the example DSL where a tensor proxy contains a reference to a tensor implementation and both the proxy and the implementation maintain access to the tensor parameters, according to one or more disclosed implementations.

Referring now to FIG. 3, a class diagram representing an example relationship of a tensor proxy instance (300) to a tensor implementation instance (310), according to one or more disclosed examples. In this example, the tensor proxy instance contains variables (which may be pointers to original variables) to support the cycle avoidance algorithm as disclosed herein. Also, as mentioned above, the cycle avoidance algorithm may only be invoked selectively based on different optimizations. In this case, a cycle avoidance algorithm may be invoked, in part, because the result of a computation graph may be designated (e.g., by source code) to be assigned to an operand in the computation (e.g., a compound operation).

In the example of FIG. 3, ImplPtr variable (315) holds an address to the memory location of the instance of tensor implementation (310). In this example, both tensor proxy (300) and tensor implementation (310) maintain access to (e.g., via pointers) the same values represented in the diagram as tensor parameters (320). Those of ordinary skill in the art will recognize that commands representing execution of computation operations on an instance of tensor proxy (300) are automatically forwarded to a corresponding instance of tensor implementation (310). The automatic forwarding may be accomplished based on a proxy instance using the memory address stored in ImplPtr variable (315). Thus, at least one level of indirection (as discussed above) may be provided for a tensor variable.

Figure 4:
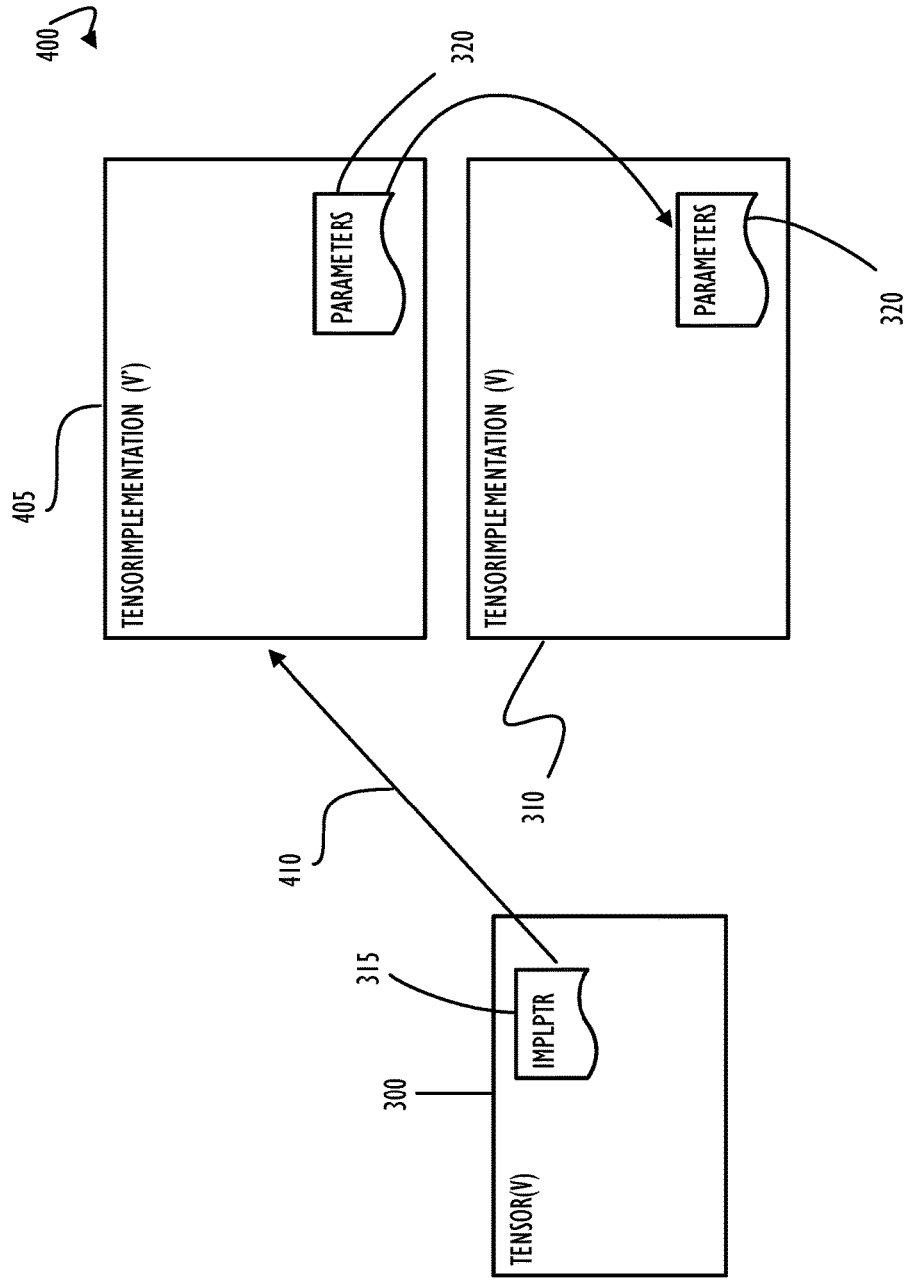
FIG. 4 is a block diagram representing details of one example where the proxy tensor avoids a cyclic computation graph by pointing to a new copy of a tensor implementation, according to one or more disclosed implementations.

Referring to FIG. 4, block diagram 400 illustrates changes to tensor proxy instance (300) from FIG. 3 to avoid cyclical computation graph (210) illustrated in FIG. 2. Tensor proxy instance (300), as illustrated in block diagram 400, changes the memory address value stored in variable ImplPtr (315) to point (as illustrated by arrow 410) to a new instance of tensor implementation (405). In this case the new instance is named V' (V prime). The original tensor implementation (310) is still in memory as part of the NN computation model. Based on this level of indirection, created in part by a proxy technique, operations on tensor proxy instance (300) are now forwarded (redirected) to the new instance of tensor implementation (405). Also, in this example, parameters (320) may be maintained in the previous instance of tensor implementation (310) and accessible via pointer. Further, some elements of the new instance of tensor implementation (405) may be stored as copies of those elements that are not mutated (e.g., changed) by applying the disclosed cycle avoidance algorithm using an indirection technique.

Figure 5:
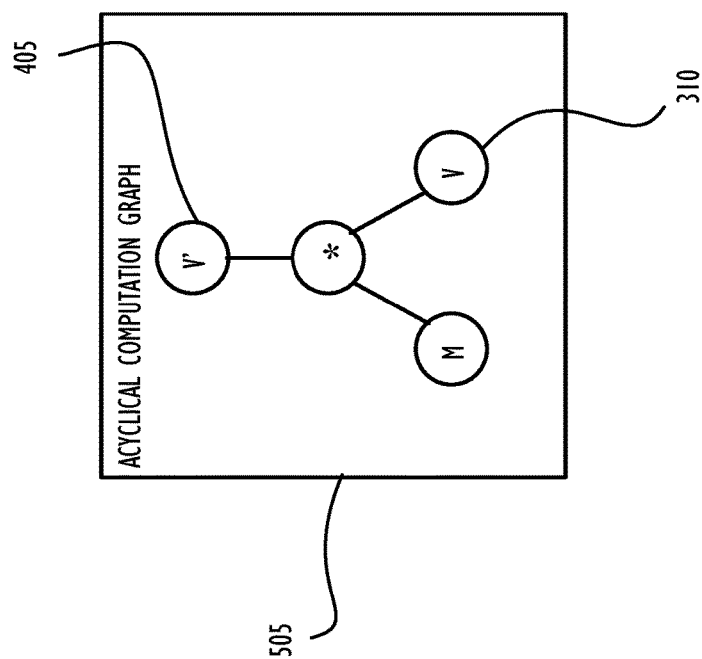
FIG. 5 is a block diagram representing the acyclic computation graph resulting when the example cycle avoidance algorithm detects that a new copy of the implementation needs to be used by the proxy, according to one or more disclosed implementations.

Referring to FIG. 5, block diagram 500 illustrates acyclical computation graph (505), which, in this example, represents a possible computation graph resulting from the tensor relationships described above for FIG. 4. Note that computation graph (500) still refers to the original tensor implementation (310) as an operand in the computation. As outlined above, a new instance of tensor implementation (405) is used, in this example, to store the result of the example computation without modifying the original instance of the tensor implementation (310). Thus, a multiplication of two tensor variables may be completed where one of the variables is both the assignment variable and an operand of the multiplication (e.g., V=V*M).

Figure 6:
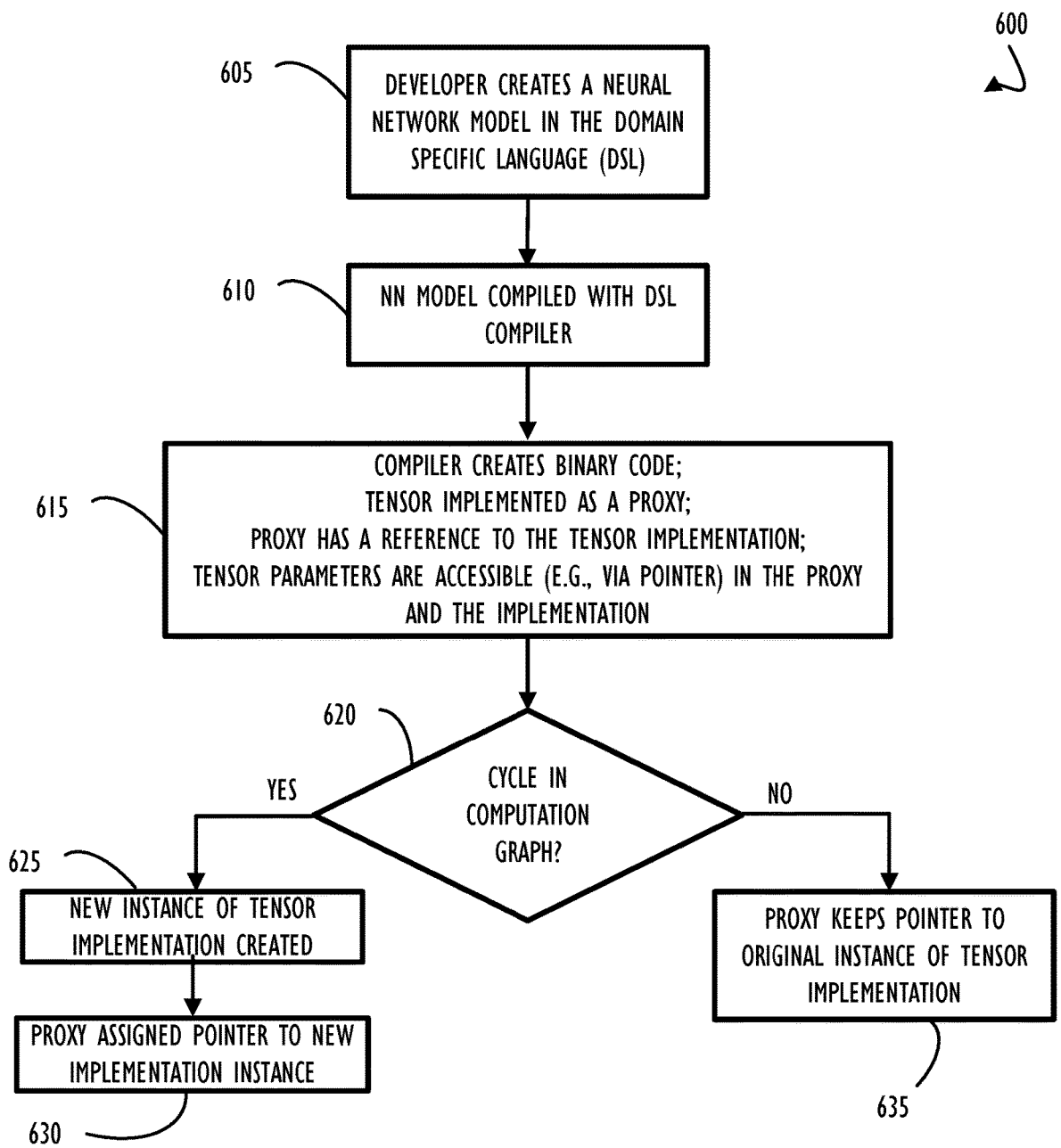
FIG. 6 is an example flowchart illustrating creation of one possible neural network model in the example DSL and then a compiler utilizing the proxy to avoid cycles in the computation graph, according to one or more disclosed implementations.

Referring to FIG. 6, there is shown a flow diagram to represent one example method 600 that may be used to develop (e.g., create source code and prepare an executable) and execute any number of NN models using the DSL and loop avoidance techniques of this disclosure. Method 600 begins at block 605 where a developer may express the desired NN model in the DSL language. This NN model may be expressed, for example, using a plurality of statements in the DSL stored on a computer readable medium. The compiler may then be invoked (e.g., executed) to read and interpret the DSL to create an NN model as explained in block 610. The result of compiler execution (610) may be an executable binary image as indicated in block 615. In this example, an executable binary image created in block 615 may have implemented instances of tensors as proxies that point to a tensor implementation. For example, the above disclosed indirection may have been applied as a preprocessor to, or as part of, the compiler function. Accordingly, the tensor proxies and tensor implementation in the binary image created in block 615 may each maintain access to any parameters that each tensor proxy and tensor implementation have in common (e.g., pointers may be used to maintain appropriate access to data parameters that may require update in a single location).

Continuing with FIG. 6, decision 620 indicates that a check may be made to determine if a cycle exists in the computation graph. If a cycle does not exist, the NO prong of decision 620, flow continues to block 635 where the relationship between the tensor proxy and the tensor implementation is not changed. If, however, a cycle exists (or is about to be created) in the computation graph, the YES prong of decision 620, a new instance of the tensor implementation may be provided for the tensor that is creating the cycle. The new instance of the tensor implementation is illustrated in block 625. Block 630 indicates that the tensor proxy may be modified to point to the new instance of the tensor implementation. As outlined above, there are different points in the development lifecycle and in the compilation process where a tensor proxy redirection may be provided. For example, a binary may be modified prior to completing the compilation process, a parser of a compile function may provide redirection, or a pre-processor to the compile function may examine and adjust source code prior to passing the modified source code to the actual compiler. These are just examples and combinations of the above timing parameters may also be used (e.g., different portions of a compilation process working together to produce an overall result).

Figure 7:
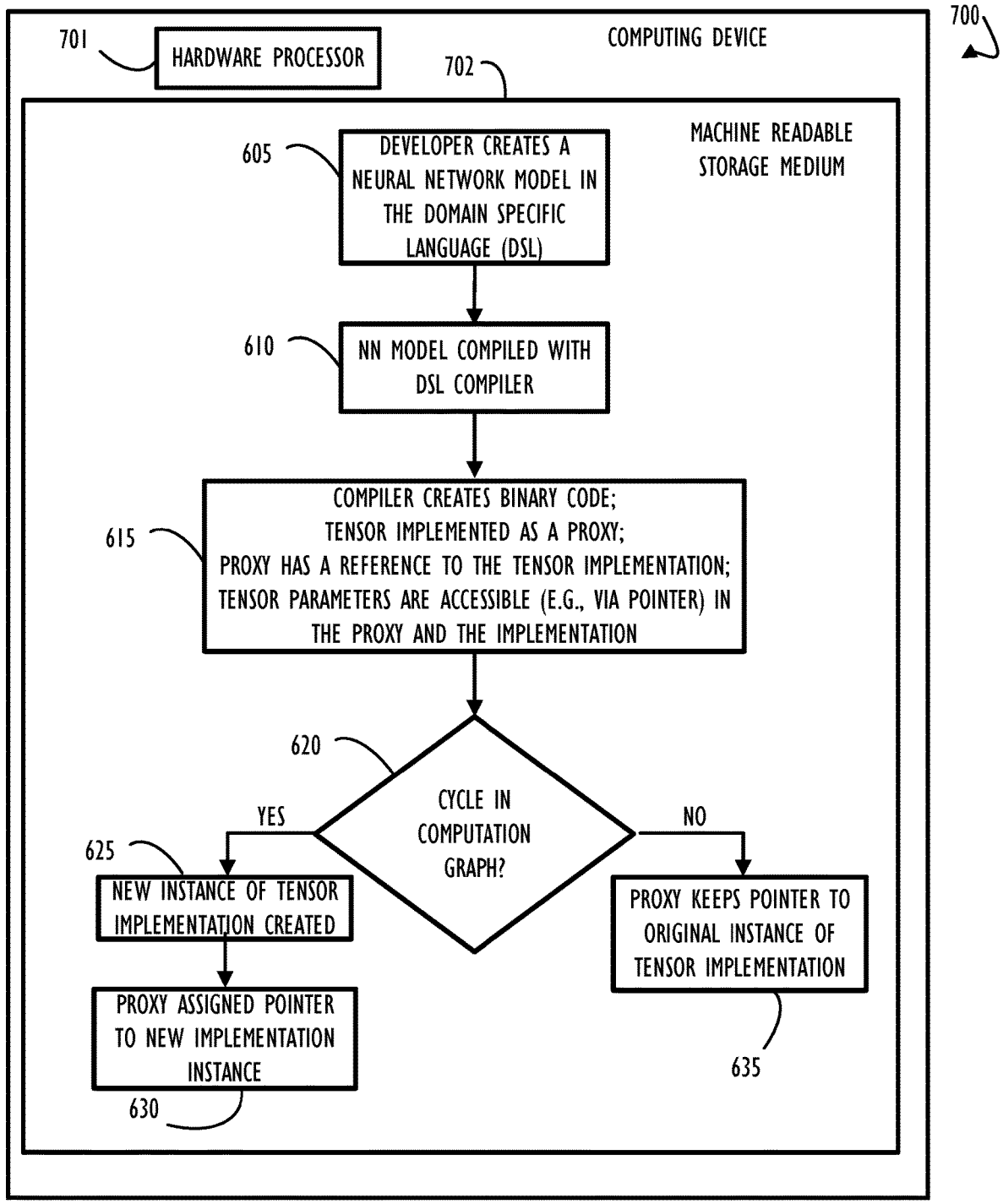
FIG. 7 is an example computing device with a hardware processor and accessible machine-readable instructions that might be used to compile and execute a neural network model defined in the example domain specific language (DSL), according to one or more disclosed implementations.

FIG. 7 is an example computing device 700, with a hardware processor 701, and accessible machine-readable instructions stored on a machine-readable medium 702 that may be used to support the above discussed development and execution of an NN model using the disclosed DSL and level of indirection techniques, according to one or more disclosed example implementations. FIG. 7 illustrates computing device 700 configured to perform the flow of method 600 as an example. However, computing device 700 may also be configured to perform the flow of other methods, techniques, functions, or processes described in this disclosure. In this example of FIG. 7, machine-readable storage medium 702 includes instructions to cause hardware processor 701 to perform blocks 605-635 discussed above with reference to FIG. 6. Note, block 605 refers in the context of FIG. 7 refers to instructions to obtain a developer created code set, for example, DSL source code (previously created by a developer) obtained from a file accessible to computing device 700.

A machine-readable storage medium, such as 702 of FIG. 7, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 8:
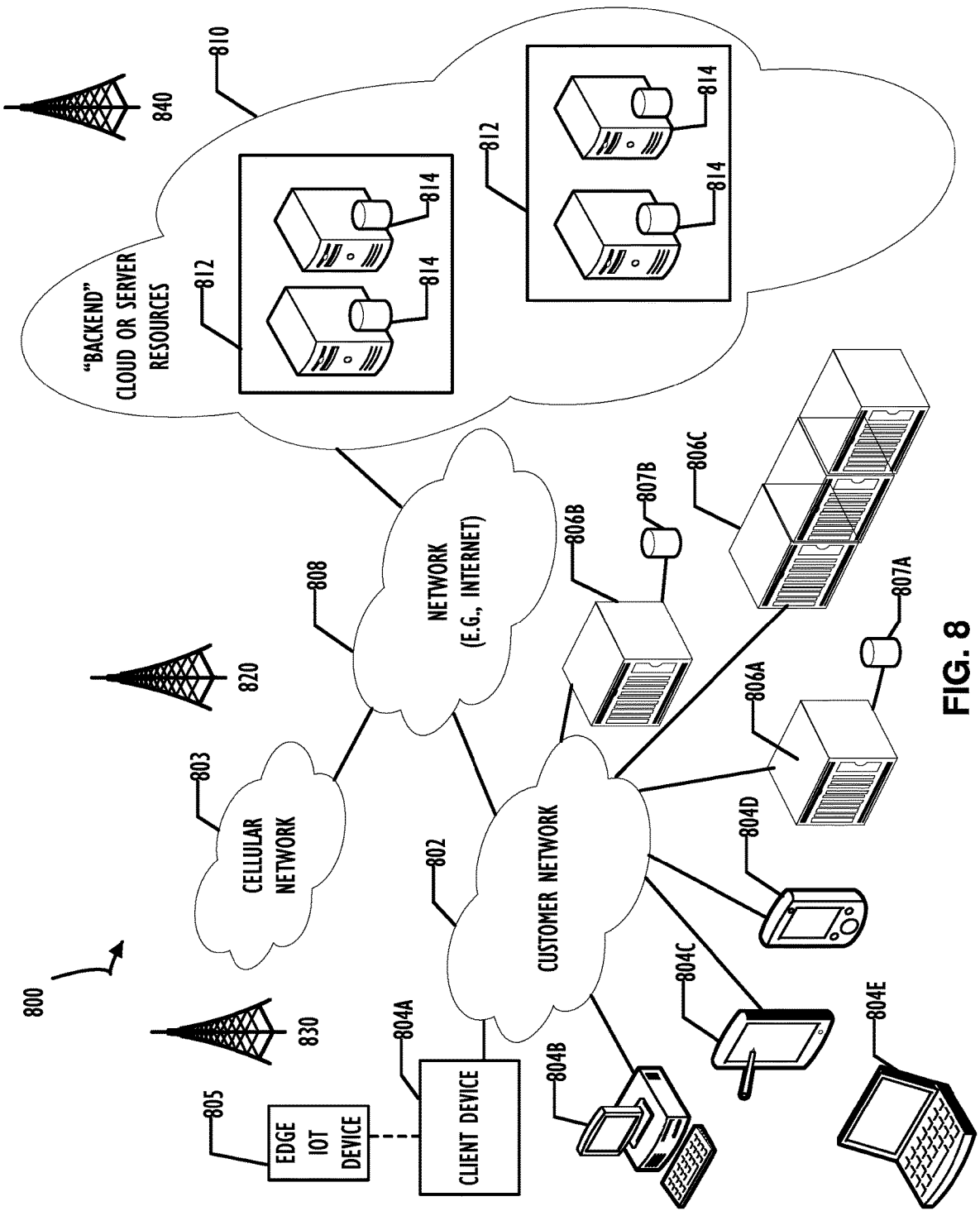
FIG. 8 represents a computer network infrastructure that may be used to implement all or part of the disclosed DSL compiler and loop avoidance techniques as well as providing an example infrastructure where a resultant NN may be deployed, according to one or more disclosed implementations.
Figure 9:
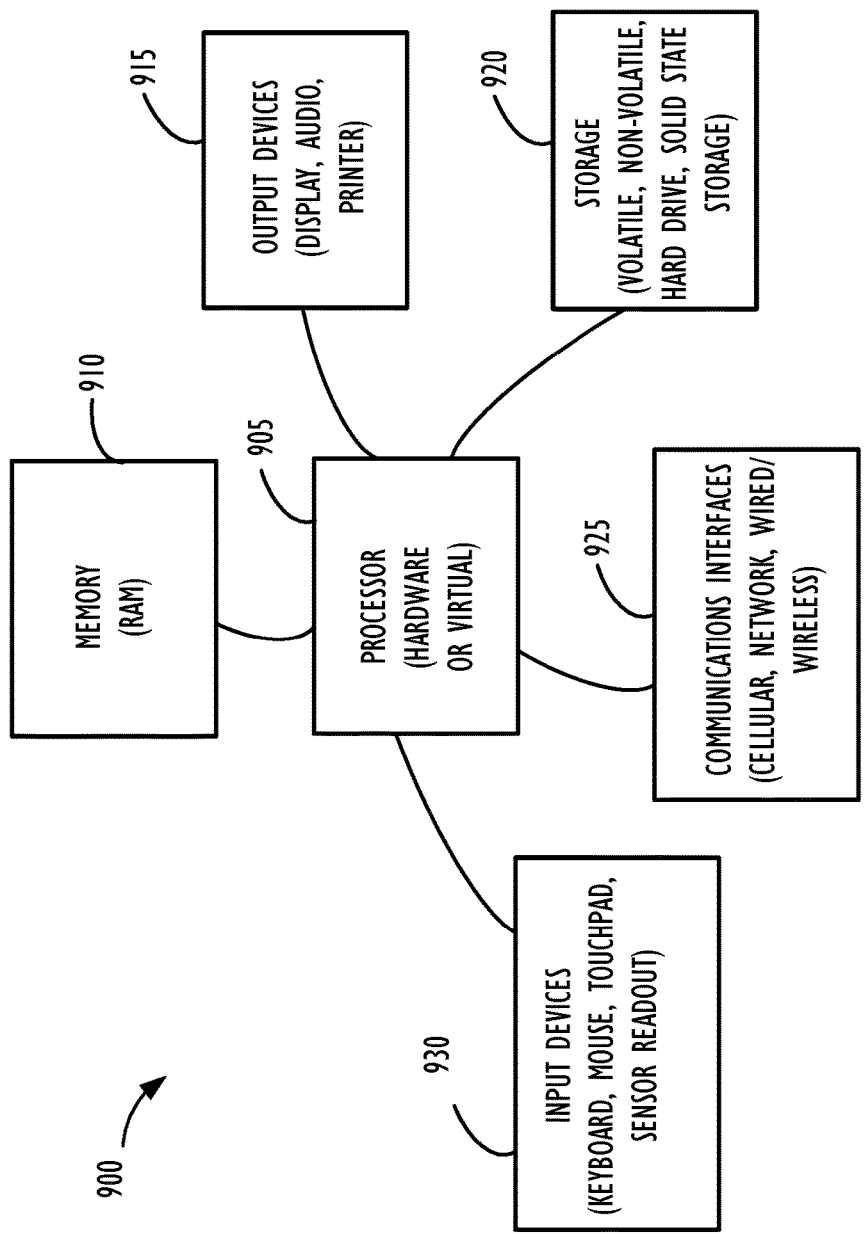
FIG. 9 illustrates a computer processing device that may be used to implement the functions, modules, processing platforms, execution platforms, communication devices, and other methods and processes of this disclosure.

FIG. 8 represents a computer network infrastructure that may be used to implement all or part of the disclosed NN creation and execution techniques (e.g., using a DSL compiler including an indirection capability), according to one or more disclosed implementations. Network infrastructure 800 includes a set of networks where embodiments of the present disclosure may operate (e.g., components shown may execute a resultant NN mode in a run-time deployment scenario). Network infrastructure 800 comprises a customer network 802, network 808, cellular network 803, and a cloud service provider network 810. In one embodiment, the customer network 802 may be a local private, network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 802 represents an enterprise network that could include or be communicatively coupled to one or more local area networks (LANs), virtual networks, data centers and/or other remote networks (e.g., 808, 810). In the context of the present disclosure, customer network 802 may include multiple devices configured with the disclosed NN processing techniques such as those described above. Also, one of the many computer storage resources in customer network 802 (or other networks shown) may be configured to store the DSL source code created by developers as discussed above.

As shown in FIG. 8, customer network 802 may be connected to one or more client devices 804A-E and allow the client devices 804A-E to communicate with each other and/or with cloud service provider network 810, via network 808 (e.g., Internet). Client devices 804A-E may be computing systems such as desktop computer 804B, tablet computer 804C, mobile phone 804D, laptop computer (shown as wireless) 804E, and/or other types of computing systems generically shown as client device 804A.

Network infrastructure 800 may also include other types of devices generally referred to as Internet of Things (IoT) (e.g., edge IOT device 805) that may be configured to send and receive information via a network to access cloud computing services or interact with a remote web browser application (e.g., to receive information from a user).

FIG. 8 also illustrates that customer network 802 includes local compute resources 806A-C that may include a server, access point, router, or other device configured to provide for local computational resources and/or facilitate communication amongst networks and devices. For example, local compute resources 806A-C may be one or more physical local hardware devices, such as the different configurations of NN processing systems outlined above. Local compute resources 806A-C may also facilitate communication between other external applications, data sources (e.g., 807A and 807B), and services, and customer network 802. Local compute resource 806C illustrates a possible processing system cluster with three nodes. Of course, any number of nodes is possible, but three are shown in this example for illustrative purposes.

Network infrastructure 800 also includes cellular network 803 for use with mobile communication devices. Mobile cellular networks support mobile phones and many other types of mobile devices such as laptops etc. Mobile devices in network infrastructure 800 are illustrated as mobile phone 804D, laptop computer 804E, and tablet computer 804C. A mobile device such as mobile phone 804D may interact with one or more mobile provider networks as the mobile device moves, typically interacting with a plurality of mobile network towers 820, 830, and 840 for connecting to the cellular network 803. In the context of the current monitoring and event ingestion management, user alerts as to initiating of throttling actions may be configured to provide an end-user notification. In some implementations, this notification may be provided through network infrastructure 800 directly to a system administrators cellular phone.

Although referred to as a cellular network in FIG. 8, a mobile device may interact with towers of more than one provider network, as well as with multiple non-cellular devices such as wireless access points and routers (e.g., local compute resources 806A-C). In addition, the mobile devices may interact with other mobile devices or with non-mobile devices such as desktop computer 804B and various types of client device 804A for desired services.

FIG. 8 illustrates that customer network 802 is coupled to a network 808. Network 808 may include one or more computing networks available today, such as other LANs, wide area networks (WAN), the Internet, and/or other remote networks, in order to transfer data between client devices 804A-D and cloud service provider network 810. Each of the computing networks within network 808 may contain wired and/or wireless programmable devices that operate in the electrical and/or optical domain.

In FIG. 8, cloud service provider network 810 is illustrated as a remote network (e.g., a cloud network) that is able to communicate with client devices 804A-E via customer network 802 and network 808. The cloud service provider network 810 acts as a platform that provides additional computing resources to the client devices 804A-E and/or customer network 802. In one embodiment, cloud service provider network 810 includes one or more data centers 812 with one or more server instances 814. Each of these resources may work together with non-cloud resources to provide execution of or interface to deployed NN models as discussed herein.

FIG. 9 illustrates a computer processing device 900 that may be used to implement the functions, modules, processing platforms, execution platforms, communication devices, and other methods and processes of this disclosure. For example, computing device 900 illustrated in FIG. 9 could represent a client device or a physical server device and include either hardware or virtual processor(s) depending on the level of abstraction of the computing device. In some instances (without abstraction), computing device 900 and its elements, as shown in FIG. 9, each relate to physical hardware. Alternatively, in some instances one, more, or all of the elements could be implemented using emulators or virtual machines as levels of abstraction. In any case, no matter how many levels of abstraction away from the physical hardware, computing device 900 at its lowest level may be implemented on physical hardware.

Computing device 900 may be used to implement any of the devices that are used by developers to create DSL source code to represent NN models or to execute a resultant NN model (e.g., to create or execute the disclosed acyclic NN including proxy tensor implementations). As also shown in FIG. 9, computing device 900 may include one or more input devices 930, such as a keyboard, mouse, touchpad, or sensor readout (e.g., biometric scanner) and one or more output devices 915, such as displays, speakers for audio, or printers. Some devices may be configured as input/output devices also (e.g., a network interface or touchscreen display).

Computing device 900 may also include communications interfaces 925, such as a network communication unit that could include a wired communication component and/or a wireless communications component, which may be communicatively coupled to processor 905. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 9, computing device 900 includes a processing element such as processor 905 that contains one or more hardware processors, where each hardware processor may have a single or multiple processor core. In one embodiment, the processor 905 may include at least one shared cache that stores data (e.g., computing instructions) that are utilized by one or more other components of processor 905. For example, the shared cache may be a locally cached data stored in a memory for faster access by components of the processing elements that make up processor 905. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 9, the processing elements that make up processor 905 may also include one or more of other types of hardware processing components, such as graphics processing units (GPU), application specific integrated circuits (ASICs), field-programmable gate arrays (FPGAs), and/or digital signal processors (DSPs).

FIG. 9 illustrates that memory 910 may be operatively and communicatively coupled to processor 905. Memory 910 may be a non-transitory medium configured to store various types of data. For example, memory 910 may include one or more storage devices 920 that comprise a non-volatile storage device and/or volatile memory. Volatile memory, such as random-access memory (RAM), can be any suitable non-permanent storage device. The non-volatile storage devices 920 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 920 may be used to store overflow data if allocated RAM is not large enough to hold all working data. The non-volatile storage devices 920 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 905. In one embodiment, the compiling process of the software program may transform program code written in a programming language to another computer language such that the processor 905 is able to execute the programming code. For example, the compiling process of the software program may generate an executable program that provides encoded instructions (e.g., machine code instructions) for processor 905 to accomplish specific, non-generic, particular computing functions.

After the compiling process, the encoded instructions may then be loaded as computer executable instructions or process steps to processor 905 from storage device 920, from memory 910, and/or embedded within processor 905 (e.g., via a cache or on-board ROM). Processor 905 may be configured to execute the stored instructions or process steps in order to perform instructions or process steps to transform the computing device into a non-generic, particular, specially programmed machine or apparatus. Stored data, e.g., data stored by a storage device 920, may be accessed by processor 905 during the execution of computer executable instructions or process steps to instruct one or more components within the computing device 900.

A user interface (e.g., output devices 915 and input devices 930) can include a display, positional input device (such as a mouse, touchpad, touchscreen, or the like), keyboard, or other forms of user input and output devices. The user interface components may be communicatively coupled to processor 905. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 900 may comprise other components well known in the art, such as sensors, powers sources, and/or analog-to-digital converters, not explicitly shown in FIG. 9.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method of managing cycles in graphs for a computer device, the method comprising:
as part of a compilation process from a source code to a binary executable code, detecting a compound operation including a first tensor, the compound operation resulting from the source code represented in a first graph structure;
creating an instance of a proxy class to store a pointer to a proxy instance of the first tensor based on a determination that the first tensor is linked to other tensors as part of the compound operation that causes a cyclic portion of the first graph structure, wherein tensor parameters are stored in the proxy instance of the first tensor, and pointers to the tensor parameters are stored in the instance of the proxy class; and
using the instance of the proxy class to facilitate implementation of a level of indirection to replace the cyclic portion of the first graph structure with an acyclic portion to create a second graph structure, wherein the second graph structure indicates assignment of a result of the compound operation to the proxy instance of the first tensor.

2. The method of claim 1, further comprising:
calculating the result of the compound operation; and
storing the result in the proxy instance of the first tensor.

3. The method of claim 1, wherein the source code represents a domain specific language for programming of neural networks.

4. The method of claim 1, wherein the level of indirection represents a level of indirection across multiple layers of the first graph structure.

5. The method of claim 1, wherein detecting the compound operation is performed as part of a pre-processor to a compiler.

6. The method of claim 1, wherein detecting the compound operation is performed at multiple points within the compilation process, the multiple points including a parsing function and a code analysis function.

7. The method of claim 6, wherein the multiple points further include a binary code generation function.

8. The method of claim 1, wherein the proxy instance of the first tensor is a first proxy instance of the first tensor, wherein prior to the creation of the first proxy instance of the first tensor, the instance of the proxy class stores pointers to tensor parameters in a second proxy instance of the first tensor, and wherein the method comprises:
in response to the determination that the first tensor is linked to the other tensors as part of the compound operation:
modify the instance of the proxy class to store the pointers to the tensor parameters in the first proxy instance of the first tensor.

9. The method of claim 8, wherein in the compound operation the first tensor appears in the result of the compound operation and in an operand of the compound operation.

10. The method of claim 1, wherein the level of indirection is created only when an operand in the compound operation matches the first tensor when the first tensor receives assignment of the result.

11. A computer device comprising:
a hardware processor; and a non-transitory storage medium storing instructions executable on the hardware processor to:
obtain a source code representation of a neural network program, the source code representation being according to a domain specific language (DSL);
parse and process the source code representation to create a graph structure for use in execution of the neural network program;
create an instance of a proxy class to store a pointer to a first proxy instance of a first tensor;
detect, in the source code representation, a compound operation including the first tensor, the compound operation in the source code representation modeled in the graph structure as a cycle in the graph structure;
in response to detecting the compound operation:
provide a second proxy instance of the first tensor, and
modify the instance of the proxy class to store a pointer to the second proxy instance of the first tensor; and
use the instance of the proxy class to facilitate implementation of a level of indirection to replace the cycle in the graph structure with an acyclic portion to create an acyclic graph structure, wherein the acyclic graph structure indicates assignment of a result of the compound operation to the second proxy instance of the first tensor.

12. The computer device of claim 11, wherein the instructions are executable on the hardware processor to:
calculate the result of the compound operation; and
store the result in the second proxy instance of the first tensor.

13. The computer device of claim 11, wherein the level of indirection represents a level of indirection across multiple layers of the graph structure.

14. The computer device of claim 11, wherein detecting the compound operation is performed as part of a pre-processor to a compiler.

15. The computer device of claim 11, wherein tensor parameters are stored in the second proxy instance of the first tensor, and pointers to the tensor parameters are stored in the instance of the proxy class.

16. The computer device of claim 11, wherein in the compound operation the first tensor appears in the result of the compound operation and in an operand of the compound operation.

17. A non-transitory computer readable medium comprising instructions that when executed by one or more hardware processors cause the one or more hardware processors to:
obtain a source code representation of a neural network program, the source code representation being according to a domain specific language (DSL);
parse and process the source code representation to create a graph structure for use in execution of the neural network program;
create an instance of a proxy class to store a pointer to a first proxy instance of the first tensor;
detect, in the source code representation, a compound operation including a first tensor, the compound operation in the source code representation modeled in the graph structure as a cycle in the graph structure;

in response to detecting the compound operation:
provide a second proxy instance of the first tensor, and modify the instance of the proxy class to store a pointer to the second proxy instance of the first tensor; and use the instance of the proxy class to facilitate implementation of a level of indirection to replace the cycle in the graph structure with an acyclic portion to create an acyclic graph structure, wherein the acyclic graph structure indicates assignment of a result of the compound operation to the second proxy instance of the first tensor.

18. The non-transitory computer readable medium of claim 17, wherein the instructions when executed by the one or more hardware processors cause the one or more hardware processors to:
calculate the result of the compound operation; and
store the result in the second proxy instance of the first tensor.

19. The non-transitory computer readable medium of claim 17, wherein the level of indirection represents a level of indirection across multiple layers of the graph structure.

20. The non-transitory computer readable medium of claim 17, wherein the obtaining, the parsing and processing, the creating of the instance of the proxy class, the detecting of the compound operation, the modifying of the instance of the proxy class, and the using of the instance of the proxy class are performed as part of a compilation process from the source code representation to a binary executable code.

* * * * *